Figure 1:
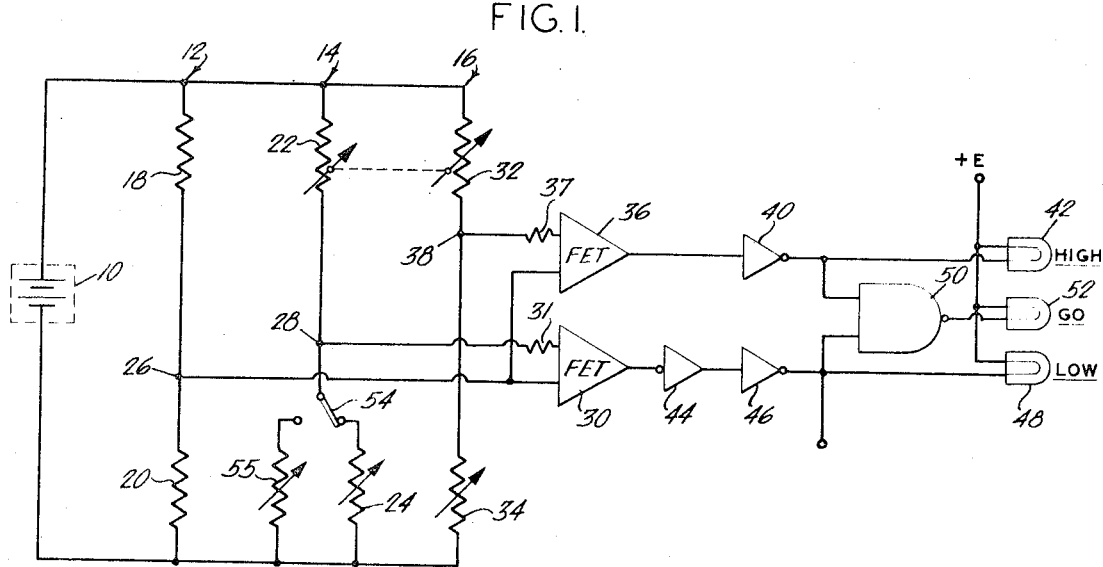

United States Patent [19]  [11] 3,784,906
Ironside  [45] Jan. 8, 1974

[54] BRIDGE HAVING MULTIPLE NULLS

[75] Inventor: Donald S. Ironside, King of Prussia, Pa.

[73] Assignee: James G. Biddle Company, Plymouth Meeting, Pa.

[22] Filed: Nov. 1, 1971

[21] Appl. No.: 194,400

[52] U.S. Cl. ............................ 324/62, 324/DIG. 1
[51] Int. Cl. ............................................ G01r 27/02
[58] Field of Search ...................... 324/62 R, DIG. 1

[56] References Cited
UNITED STATES PATENTS

| | | | |
|---|---|---|---|
| 2,479,051 | 8/1949 | Sunstein | 324/DIG. 1 |
| 2,393,669 | 1/1946 | Wheaton et al. | 324/DIG. 1 |
| 2,925,554 | 2/1960 | Hayes | 324/62 R X |
| 3,461,383 | 8/1969 | Kleven | 324/62 R |
| 3,646,435 | 2/1972 | Rozenson et al. | 324/62 R |
| 3,491,293 | 1/1970 | Seaborn, Jr. | 324/62 R |

Primary Examiner—Stanley T. Krawczewicz
Attorney—Howson & Howson and John C. Dorfman

[57] ABSTRACT

A multiple null bridge has more than two parallel branches, all of the branches being divided into two series portions of predetermined resistance ratio, except the first branch which contains a known resistance and means for connecting an unknown resistance in series with the known resistance. High input impedance d.c. null-detecting amplifiers all have one input terminal connected between the known and unknown resistance in the first branch with the other input terminal of each amplifier being connected between the respective series portions of different ones of the other parallel branches. The amplifiers are of high input impedance type so that they will not load the voltage divider branches in off-null condition.

9 Claims, 2 Drawing Figures

PATENTED JAN 8 1974  3,784,906

BRIDGE HAVING MULTIPLE NULLS

This invention relates to a modified Wheatstone bridge providing multiple parallel branches across a common potential source such that using different ones of the branches different nulls may be detected.

The resistance bridge of the present invention, is particularly adapted to applications such as resistor trimming or testing, where the final resistance of the resistor must fall within certain tolerance limits, which may be selected to be the nulls detected by different branches of a dual null bridge of the present invention.

In the prior art two techniques have been used for production and testing of resistors. The so-called constant current and voltmeter method is more versatile and has other advantages in hybrid circuit work, but it employs relatively expensive equipment which is also expensive to maintain. The other technique involves the use of a Wheatstone (or Kelvin) bridge, which is simpler, results in lower costs and higher reliability. Bridge testers for such work can be further classed as bridges which enable decisions only at bridge null and bridges which enable decisions at some deviation from null. The deviation type bridge is more flexible than the null type, but it requires that the deviation be calibrated, as well as the bridge itself. Thus, it is more complex and costly and has more elements which can contribute to error than does the null type. Therefore, the deviation type is less satisfactory than the null type for fully automatic resistor trimming or testing application. By contrast, the null operating bridge lends itself to automatic operation and is the simplest and most reliable system for this application. For those reasons, most trim control and test systems today employ null operating bridges in some form.

One difficulty with null operating bridges has been that they can make only one comparison at a time. Automatic systems employing null bridges, despite the simplicity of the bridge itself, therefore, tend to become complicated, cumbersome in operation, and expensive in the control logic because of the need for sequential operations changing bridge values, for example.

The present invention concerns a multiple null direct current bridge whereby the relationship of an unknown resistance to a number of null points may be determined at one time. Such a bridge in its resistance bridge version lends itself to resistor trimming operations, for example, where the resistance of the unknown is adjusted while connected into the bridge, and the logic involved may be very simplified and inexpensive.

Multiple null bridges are as simple as other Wheatstone bridges of the same type. Thus, the bridges themselves are capable of easy and inexpensive maintenance, as well as initial low cost, and yet perform to a high degree of accuracy. The logic which accompanies this multiple null bridge may also be very much reduced in complexity, and, therefore, very much less expensive than logic used with bridge systems in the prior art.

More specifically, the multiple null bridge of the present invention contemplates a direct current Wheatstone bridge testing circuit of the type employing a source of potential across first and second parallel branches, each in operation consisting of two resistances in series. The first branch contains a known resistance and means for receiving an unknown resistance to be tested. The second branch consists of series resistances of predetermined ratio. The improvement providing the multiple null feature consists of adding additional branches in parallel with the first two and using separate high input impedance null detecting amplifiers across a common point in the first branch and each of the other branches between the resistances of known ratio as the null detecting means. As a result of this combination, a multiple null bridge is formed, permitting simultaneous comparisons of an unknown impedance with respect to separate null points.

The invention also lends itself to logic associated with the multiple null bridge. For example, logic may be associated with the dual null resistance bridge such that each of the two high input impedance amplifiers feeds a common logic circuit, which indicates whether the resistance of an unknown resistor undergoing trimming is higher than both nulls, lower than both nulls, or between the nulls. Such logic may be used, in turn to completely automate a multiple null test bridge according to the invention or, for example, to give visual aid to the test bridge operator.

The invention also contemplates a method of trimming resistors to a resistance intermediate the respective null points of a dual null Wheatstone bridge, involving the following steps: First, placing as an unknown resistance a resistor to be trimmed to a resistance value between the two null points in a dual null Wheatstone bridge. Then, adjusting the resistance by known technique while the resistance is in the bridge, at the same time monitoring the output signals from the two amplifiers, and finally ceasing adjustment when the resistance of the unknown passes one null and lies between the two nulls.

Figure 2:
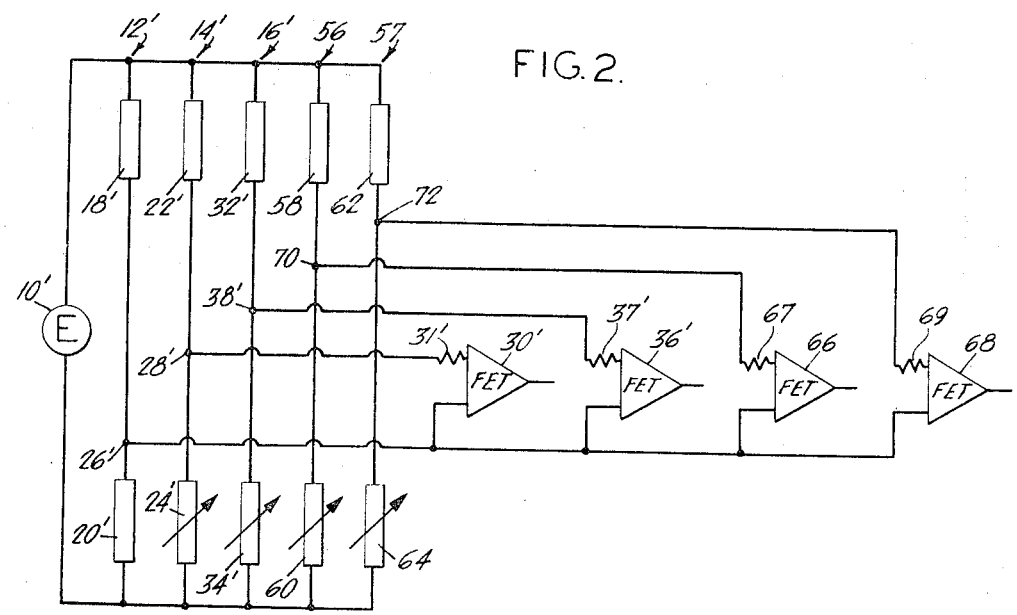

For a better understanding of the present invention, reference is made to the accompanying drawings in which FIG. 1 is a preferred embodiment of a multiple null bridge in accordance with the present invention shown with a simple logic circuit designed to aid in trimming resistors; and FIG. 2 shows a modified multiple null bridge.

Referring first to FIG. 1, the dual null bridge schematically shown employs a DC voltage source 10 which is applied across three parallel branches, generally designated 12, 14 and 16. the bridge is a resistance bridge with the parallel branches consisting of resistors connected in series. Branch 12 contains a resistor 18 of known resistance and a resistance 20 to be tested. In practice, the bridge has means for receiving the resistance to be tested, usually an unknown resistance which is changed for each test, including suitable clips or terminals to make good electrical connection to the unknown resistance during the test procedure. Parallel branch 14 contains resistors 22 and 24, which in any given test situation have a predetermined ratio. As is common in Wheatstone bridges, a null detector may be placed across parallel branches 12 and 14 at points 26 and 28, which are respectively the points between resistors 18 and 20 and resistors 22 and 24. In the conventional type of Wheatstone bridge, a galvanometer or other simple current indicator placed across points 26 and 28 conducts current if the voltages at points 26 and 28 are not identical. In the conventional situation the bridge is initially out of balance so that if current were conducted, balance could be achieved by adjusting the resistance of one of the resistors in a direction which would cause the ratio of the resistors 18 and 20 to correspond to the ratio of resistors 22 and 24. In the practical embodiment where resistor 20 is unknown and being trimmed so that its resistance is changed toward the point of balance, when balance is achieved, the resistor 20 is a "known" resistance, known or calculatable from its ratio with respect to the resistance of resistor 18 which equals the ratio of the resistances of resistors 24 and 22.

In accordance with the present invention, a null detector of low input current characteristics is connected between the points 26 and 28. In practical terms this null detector may be a high input impedance amplifier 30. In the normal Wheatstone bridge it is not essential to use a high input impedance. In accordance with the present invention, however, the high input impedance of the amplifier as a practical matter is essential in order to prevent inaccuracies due to loading of the circuit branch 12 to which the null detector is connected due to current flow through the amplifier when the voltages at points 26 and 28 are not equal. Such loading at times would affect the accuracy of measurement in other parallel branches. A high input impedance amplifier of the type employed here is exemplified by and made practical by, the field effect transistor (FET) which is ideal to provide the amplifiers employed with the required high input impedance. As an example, commercially available field effect transistor amplifiers, such as model A122 of Intech Corporation, may be used ordinarily with appropriate modification. The appropriate modification consists of addition of a current limiting resistor, such as resistor 31, to at least one input of the commercially available FET amplifier. An FET differential amplifier assures high input impedance and low input current both when near null, and for a useful range of several volts, typically greater than 10 volts, either side of null. Current limiting resistor 31 protects the FET amplifier from excessive current flow when the input voltage exceeds the high resistance range of the input FET device, that is, when input voltage reaches a value where the FET amplifier would otherwise be destroyed because of high power dissipation within it. In normal operation such high voltage does not occur by design when the bridge values are such that any of the null detectors is at or near null. However, high voltage can occur when none of the null detectors is near null, as for example, should resistor 20 be removed from the bridge or have an unexpectedly high or low value. In such situations resistor 31 limits current to a value which does not damage the FET amplifier 30. It will be understood by those skilled in the art that in certain applications where the bridge design itself is sufficiently current limiting, resistor 31 need not be added as a separate element since it is, in effect, inherent in the circuit design. The high impedance of amplifier 30 reduces to negligible levels the current flow between the points 26 and 28, so that branch 12 is not loaded, and its effect upon the bridge as a whole changed by such current flow.

The third parallel branch 16, like the second parallel branch 14, contains a pair of resistors 32 and 34 having a predetermined resistance ratio different from the ratio of resistors 22 and 24. The second high input impedance amplifier 36 is connected between point 26 and point 38 which lies between resistors 32 and 34. Thus, the branches 12 and 16 constitute an independent bridge with an independent null detection device 36.

For the expected range of the resistors in the bridge, and the range of bridge supply voltage, there is a range of values of voltage appearing across amplifier 36 when amplifier 30 is at a null. The design must provide that amplifier input current under all such conditions is low enough to produce less than some specified tolerable error in the null setting; such current being either of the "ohmic" type, that is increasing with applied voltage; or the "bias" type, that is, relatively insensitive to applied voltage. The worst cases occur when the supply voltage is maximum, when the several nulls are at a maximum deviation from each other, and when the resistances of the bridge branch being loaded by the off-null amplifiers are high.

In the practical cases, including that of FET amplifiers, the range of input voltage over which input current remains small is limited. It is practical to expect a maximum value of current to occur over this range. The bridge must then be designed to prevent this input voltage range being exceeded when measurements are being made. The impedance level of the bridge will determine the error magnitude caused by the resulting amplifier input current, which may be conservatively assumed to be the maximum value.

The ratio of resistors 32 and 34 may be less than the ratio of resistors 22 and 24. In such circumstances, it follows, then that an unknown resistor 20 will have to be of a higher resistance to reach the null across amplifier 36 than to reach the null across amplifier 30. This fact can be used in the practical application of trimming resistors.

In trimming applications the nulls may be set as the bounds of resistance tolerance for an acceptable finished resistor 20. The ratio of the resistances in branch 14 may be adjusted by making one of the resistors, say resistor 24, adjustable, as shown schematically. Similarly, the ratio resistances in branch 16 may be adjusted by making the resistance of resistor 34, for example, adjustable, as shown schematically in FIG. 1. After the bounds have been set by adjusting resistors 24 and 34, the resistor 20 to be adjusted is put in place. It is desirable to know immediately whether resistance is within the tolerance, or higher or lower than tolerance levels. Assuming, for example, that the resistance of resistor 20 is lower than the tolerances and material is to be taken away to increase the resistance, as by use of conventional laser trimming techniques, the trimming can be done while the resistor 20 is in the bridge. The ideal display in aid of this is to first show where the resistance lies relative to the tolerance band and then as the resistance crosses the null point of one of the amplifiers that information should be immediately displayed.

A preferred logic circuit for trimming resistors is shown in FIG. 1 connected to the outputs of amplifiers 30 and 36. The higher boundary is located by a buffer 40, in the output of amplifier 36 which buffer provides the property of switching from an "on" condition when the output of the amplifier indicates a resistance in resistor 20 higher than null to an "off" condition when the null point is crossed and the resistance becomes less than the null value. The "on" condition of buffer 40 is used to light lamp 42, indicating that the resistance value of resistor 20 is high. The output of amplifier 30, by contrast, feeds a pair of buffers 44 and 46 which function to produce an inverted switching effect, such that, when the value of resistance 20 is lower than the null point of amplifier 30, the necessary voltage to light lamp 48 is generated, and, when the resistor passes through the null of amplifier 30, a switching occurs which turns off "low" lamp 48. When the outputs of buffers 40 and 46 are both in the "off" condition, they may be used to actuate an "and" gate 50, which in turn causes lamp 52 to illuminate. Lamp 52 is the "go" light indicating that the resistor is within the tolerance zone. No error can result from this system since over-shoot will cause the "go" lamp 52 to extinguish and the high lamp 42 to illuminate. Likewise, over-shoot in the other direction will be detected by illumination of "low" lamp 48. The logic or the pieces therefor, is available in simple integrated circuits at very low cost and is easily combined with the simple three lamp circuit. The resulting resistor trimming monitoring apparatus is easy to use, even by relatively unskilled workers. Furthermore, the bridge response, including the amplifier response, is extremely rapid, so that no problem is likely to result from lag.

A switching feature can be provided whereby switch 54 can be changed from the normally closed condition shown with resistor 24 in the parallel branch 14 to a condition in which a resistor 55 is switched into the circuit in place of resistor 24. This option can be provided if it is desired to alternatively use the bridge in a process which stops trimming a resistor at a predetermined resistance, in accordance with the practice well known in the art.

While automatic control features have not been shown, it will be apparent to those skilled in the art that using suitable logic, such as that described above appropriately modified, the multi-null bridge of the present invention may be the heart of a completely or partially automatic system, automatically connecting the resistor in place, testing and sorting according to whether the tested resistor is within, above or below tolerance.

It will also be understood by those skilled in the art that the bridge circuits provided will be much more sophisticated than the bridge shown here by way of example. Conventional Kelvin bridge techniques employing a Kelvin yoke at point 26 are used, for example. Resistance 18 may be decade set or other adjustable type resistance. Resistors 22 and 32, as shown, may be range changing devices with different resistor choices for a variety of ranges. Resistors permanently used in the bridge will preferably be of highly stable wire wound types for stability over a long life and under a variety of environmental conditions.

FIG. 2 shows a modification of the bridge of FIG. 1 in which the dual null bridge has been expanded into a four null bridge. The d.c. source 10' is again impressed upon parallel series resistor branches 12', 14', 16', as well as similar additional branches 56 and 57. Similar high input impedance amplifiers to measure the nulls are provided by amplifiers 30' and 36', both having one input terminal connected to point 26' between resistors 18' and 20' and the other input terminal in the case of amplifier 30' connected to point 28' between resistor 22' and 24' and in the case of amplifier 36' connected to point 38' between resistors 32' and 34'. Additional high input impedance amplifiers 66 and 68 have one of their input terminals connected to point 26'. The other input terminal of amplifier 66 is connected to point 70 between resistors 58 and 60 in branch 56, while the other input terminal of amplifier 68 is connected to point 72 between resistors 62 and 64 in branch 57. Just as current limiting resistors 31 and 37 are employed with amplifiers 30 and 36 in the system of FIG. 1, current limiting resistors 31', 37', 67 and 69, are provided in at least one input of high impedance amplifiers 30', 36', 66 and 68. Just as in the situation of FIG. 1, the bridge of FIG. 2 must be designed to prevent the input voltage range from exceeding the maximum permissible value when measurements are being made. The total current of all of the off-null amplifiers must be considered from the standpoint of their cumulative effect upon each amplifier individually.

It will be appreciated that the ratios of resistances in each branch differ from one another in order to produce different null points. The modification of FIG. 2 is meant to illustrate that the invention is equally applicable to bridges having more than two null points up to some practical limit, which may be eleven possible null points. Thus, where applications requiring observation of an unknown impedance with respect to multiple null points is required, this can be carried out by a bridge in accordance with the present invention, using precisely the same kinds of techniques employed with the resistance bridge of FIG. 1 or the modification thereof in FIG. 2.

An example of use of the multi-null bridge of FIG. 2 is one in which the bridge is a resistor bridge and the outputs are used to classify unknown resistor 20' into one of five categories, for example ± 1 percent deviation from nominal value, +1 to +3 percent, −1 to −3 percent, greater than +3 percent and less than −3 percent deviation. This is done by one operation and saves four bridge changes necessary with a conventional bridge, which is a more complicated procedure for an operator and takes the operator as much as four times as long to perform.

It will also be obvious to one skilled in the art that the multi-null bridge of the present invention can be used with automatic response means as well as human operators.

The assumption has been made in connection with FIG. 2 that resistance 20' is the unknown. It is equally possible to have a situation where resistance 20' is known and one of the resistances in each of the other branches is "unknown". Thus, for example, in FIG. 2 resistances 24', 34', 60 and 64 may all be unknown and resistance 20' a known value. In such a system, for example, where the "unknowns", are of a known approximate value and almost equal, the multiple null bridge might be used to determine which unknowns were within predetermined tolerances. This requires ability to alternately select two different known ratios for resistors 18 and 20, one providing a null at the lower tolerance level and the other providing a null at the higher null tolerance level. The switching of known resistors 18 and 20 would then indicate those "unknown" resistors below the lower tolerance as well as those above the higher tolerance, the balance being within tolerance.

Of course, any of the bridge resistances in a given application might be selected as an unknown and the full range of such possibilities is intended to be included within the scope of the present invention.

Preferred embodiments of the invention have been illustrated and described in order to show the scope of circuit modifications and applications of multiple null bridge circuits. It will be obvious to those skilled in the art that many modifications beyond those illustrated are possible, and all such modifications within the scope of the appended claims are intended to be within the scope and spirit of the present invention.

I claim:

1. In a Wheatstone bridge testing circuit adapted to employ a direct current power source across first and second parallel branches consisting of resistances in series, wherein one branch contains a known resistance and means for receiveing an unknown resistance to be tested and the other branch consists of series resistances of predetermined ratio, the improvement of connecting a first high input impedance direct current amplifier with one input terminal connected to said first branch between the known and unknown resistances and its other terminal connected to said second branch between the resistances of predetermined ratio and adding in parallel with the first and second branches at least a third branch similar to the first or second and a second high input impedance direct current amplifier with one terminal connected to said first branch at the same point of connection as the first amplifier and the other terminal connected to said third branch at a point corresponding to the point of connection in the second branch, whereby a multiple null bridge is formed permitting at least two simultaneous comparisons of known against unknown resistances with respect to separate null points.

2. The Wheatstone bridge testing circuit of claim 1 in which at least a fourth branch containing resistances in a third predetermined ratio is connected in parallel with the first, second and third branches and a third high input impedance direct current amplifier is connected across the first and fourth branches with one terminal connected to the same point of connection in said first branch and the other terminal connected to the fourth branch between said resistance of a third predetermined ratio.

3. The Wheatstone bridge testing circuit of claim 2 in which at least a fifth branch containing resistance in a fourth predetermined ratio is connected in parallel with the first, second, third and fourth branches and fourth high impedance direct current amplifier is connected across the first and fifth branches with one terminal connected to the same point of connection in said first branch and the other terminal connected to the fifth branch between said resistances of a fourth predetermined ratio.

4. The Wheatstone bridge of claim 1 in which at least one input to each high impedance direct current amplifier contains a current limiting impedance preventing overloading of the amplifier in non-null conditions.

5. The Wheatstone bridge of claim 1 in which the high input impedance amplifiers are FET amplifiers.

6. The Wheatsone bridge of claim 5 in which at least one input to each high impedance amplifier contains a current limiting impedance preventing overloading of the amplifier in non-null conditions.

7. The Wheatstone bridge testing circuit of claim 1 in which the unknown resistance is in the first branch and the second and third branches contain resistances of known predetermined ratios different from one another, the first and second amplifiers feed a logic circuit indicating whether an unknown resistor undergoing trimming is higher than both nulls, lower than both nulls or between the nulls.

8. A method of trimming resistors to a resistance intermediate the respective null points of a dual null direct current Wheatstone bridge comprising placing a resistor to be trimmed to a resistance between the two nulls in said dual null Wheatstone bridge as an unknown resistance, adjusting the resistance while it is in said bridge, and observing the change of resistance and ceasing adjustment when its resistance passes one null and lies between the two nulls.

9. A method of classifying a resistor within three or more classes of resistance values defined by nulls of a multiple null direct current Wheatstone bridge comprising placing a resistor to be classified in said dual null Wheatstone bridge as an unknown resistance and observing between which nulls the resistor value lies or whether it lies above or below all nulls to classify it accordingly.

* * * * *